(12) United States Patent
Kossel

(10) Patent No.: US 10,237,098 B2
(45) Date of Patent: *Mar. 19, 2019

(54) METHOD AND APPARATUS FOR GENERATING A MULTI-LEVEL PSEUDO-RANDOM TEST SIGNAL

(71) Applicant: INTERNATIONAL BUSINESS MACHINES CORPORATION, Armonk, NY (US)

(72) Inventor: Marcel A. Kossel, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/835,289

(22) Filed: Dec. 7, 2017

(65) Prior Publication Data

US 2018/0097668 A1  Apr. 5, 2018

Related U.S. Application Data

(63) Continuation of application No. 14/864,447, filed on Sep. 24, 2015, now Pat. No. 9,882,752.

(30) Foreign Application Priority Data

Sep. 24, 2014 (GB) .................................. 1416859.5

(51) Int. Cl.
*H04L 25/49* (2006.01)

(52) U.S. Cl.
CPC .............................. *H04L 25/4917* (2013.01)

(58) Field of Classification Search
CPC .......... H04L 25/4917; G01R 31/31715; G01R 31/318385; H04W 24/06
See application file for complete search history.

(56) References Cited

U.S. PATENT DOCUMENTS

| 3,479,458 A | * | 11/1969 | Lord | ................... H04L 25/0305 178/69 A |
| 4,745,603 A | | 5/1988 | Shedd | |
| 6,201,870 B1 | * | 3/2001 | Medard | ................. H04L 9/0668 331/78 |
| 6,907,062 B2 | * | 6/2005 | Carlson | ................... H04L 12/66 375/222 |
| 7,162,672 B2 | | 1/2007 | Werner et al. | |
| 8,935,309 B1 | | 1/2015 | Chan et al. | |

(Continued)

FOREIGN PATENT DOCUMENTS

GB        1210563        10/1970

OTHER PUBLICATIONS

Jeong, J. et al., "A CMOS 3.2 Gb/s 4-PAM serial link transceiver," SoC Design Conference (ISOCC), 2009 International, Nov. 2009. (pp. 408-411).

(Continued)

*Primary Examiner* — Syed Haider
(74) *Attorney, Agent, or Firm* — Tutunjian & Bitetto, P.C.; Kevin M. Jordan

(57) ABSTRACT

The present invention relates to a method for generating multi-level PRBS patterns for testing purposes, wherein the method includes the steps of providing a binary PRBS signal with a binary bit pattern sequence and mapping each bit of the binary bit pattern sequence to a symbol of a multilevel output.

20 Claims, 4 Drawing Sheets

(56) References Cited

U.S. PATENT DOCUMENTS

| | | | |
|---|---|---|---|
| 8,970,068 B2 | 3/2015 | McCaslin et al. | |
| 2003/0093713 A1* | 5/2003 | Werner | G01R 31/31715 |
| | | | 714/25 |
| 2006/0242483 A1 | 10/2006 | Werner et al. | |
| 2014/0003805 A1 | 1/2014 | Singh et al. | |
| 2014/0237013 A1 | 8/2014 | Yan | |
| 2015/0187441 A1* | 7/2015 | Hollis | G11C 29/36 |
| | | | 714/719 |

OTHER PUBLICATIONS

Karout, J. et al. "CMA Misconvergence in Coherent Optical Communication for Signals Generated from a Single PRBS," 20th Annual Wireless and Optical Communications Conference (WOCC), Apr. 2011. (pp. 1-5).

Sakare, M. et al., "A 4 × 20 Gb/s 29-1 PRBS Generator for Testing a High-Speed DAC in 90nm CMOS Technology," Lecture Notes in Computer Science, vol. 7373, Jul. 2012. (pp. 252-257).

Singh, M. et al., "Testing of High-Speed DACs using PRBS Generation with Alternate-Bit-Tapping," Design, Automation & Test in Europe Conference & Exhibition (DATE), Mar. 2011. (pp. 1-6).

List of IBM Patents or Patent Applications Treated as Related dated Dec. 7, 2017, 2 pages.

* cited by examiner

METHOD AND APPARATUS FOR GENERATING A MULTI-LEVEL PSEUDO-RANDOM TEST SIGNAL

BACKGROUND

Technical Field

The present invention relates to pseudo-random bit sequence (PRBS) generators, particularly for generating multi-level test signal for input/output (I/O) circuits.

Description of the Related Art

Multi-level signaling is commonly known as multiple pulse amplitude modulation (PAM), or multi-PAM, and has been implemented with radio or other long-distance wireless signaling systems. The use of multi-level signaling for communication between devices in a closed system is relatively new, as in the past the short distance transmission of binary signals could be accelerated easily by increasing the transmission frequency. As the raise of the transmission frequency comes to its limits, multi-level signaling is an option. Using multi-level signals instead of binary signals increases the data rate of a data transmission system independent of the transmission frequency, so that, with applying multi-level signaling, the signal frequency of the system does not need to be increased.

Hence, digital I/Os which allow multi-level signaling have gained more and more importance in the last couple of years. As any other system components, parts of the system operating with multi-level signaling need to be tested, and this testing is often based on pseudo-random test signals. The testing of multi-level I/Os of devices, however, is difficult, since conventional testing equipment is typically merely providing binary test signals.

Testing equipment comprises pseudo-random binary signal (PRBS) generators which are commonly based on linear feed-back shift registers. Such PRBS generators are designed for NRZ (non-return to zero) or 2-PAM pattern and cannot provide multi-level signaling due to the concept of generation.

Recently, multi-level signaling has been generally used for inter-device communication, particularly in digital-to-analog (DAC) transmitters (Tx) and analog-to-digital (ADC) receivers (Rx), Tomlinson-Harashima precoders and the like. To provide a sufficient and appropriate testing quality/coverage of such systems, a multi-level PRBS pattern needs to provide equally distributed symbols even for a relatively short pattern length and to provide patterns which are compatible with NRZ PRBS checkers available in commonly used measurement equipment. NRZ PRBS checkers are usually configured to detect a binary level and to provide no clock boundary crossing between a PRBS generator and an I/O because of simulation time issues and re-timing of clock boundaries.

A general approach to apply a straightforward multi-level PRBS pattern, by assigning subsets of bits to a multi-level symbol, results in a pattern which is not compatible to NRZ-based PRBS checkers in commonly used measurement equipment. Since a NRZ (non-return to zero)-coded pattern generally assigns a specific state of the transmission path to every transferred symbol, the states of the signal can be distinguished by standard comparators of conventional PRBS checkers.

Furthermore, for short test pattern lengths, the symbol generated by assigning the subsets of bits to a multi-level symbol are no longer uniformly distributed. Uniform distribution is one of the requirements for proper testing of I/Os by means of a conventional PRBS checker. Furthermore, in feedback loop timing limited systems, the pattern generator needs to be operated at a much faster clock rate and hence clock boundary crossing and random-logic-macro (RLM) timing become an issue.

From document U.S. Pat. No. 7,162,672 B2, it is known that error detection mechanisms for devices that have multilevel signal interfaces test multilevel signals of an interface with a binary test apparatus. The error detection mechanisms include converting between multilevel signals of the interface and binary signals of the test apparatus.

In document US 2014/0003805 A1, a method for generating multilevel pseudo random symbol sequences for testing a transmission system is disclosed. The method employs n-th bit tapping mechanisms, where said method is comprised of generating pseudo random symbol sequences employing a linear feedback shift register; checking if said symbol sequences satisfy a pre-defined condition; and tapping bits to said symbol sequences as per said condition for producing a multilevel pseudo random symbol sequence to be fed to said transmission system.

Furthermore, in US 2006/0242483 A1, error detection mechanisms for signal interfaces, including built-in self-test (BIST) mechanisms for testing multilevel signal interfaces, are disclosed. BIST mechanisms may include test signal generators and mechanisms for determining whether the test signals generated are accurately transmitted and received by the interface. The BIST mechanisms may check a single input/output interface, a group of interfaces or may operate with a master device that tests a plurality of interfaces by sending test signals for storage by and retrieval from one or more slave memory devices.

Mahendra Sakare et al., "A 4×20 GB/S 29-1 PRBS GENERATOR FOR TESTING A HIGH-SPEED DAC IN 90 NM CMOS TECHNOLOGY", Progress in VLSI Design and Test Lecture Notes in Computer Science Volume 7373, 2012, pp. 252-257, discloses a pseudo-random binary sequence (PRBS) generator to test a 4-bit digital to analog converter (DAC). The architecture results in generation of four de-correlated sequences from a single 9-bit LFSR (linear feedback shift register) with minimal circuitry. The PRBS and DAC can together be used for generating pseudo-random multi-level test symbol sequences for high-speed communication In another document, Karout, J., "CMA MISCONVERGENCE IN COHERENT OPTICAL COMMUNICATION FOR SIGNALS GENERATED FROM A SINGLE PRBS", Dept. of Signals & Syst., Commun. Syst. Group, Sweden, Wireless and Optical Communications Conference (WOCC), 2011, 20th Annual, 15-16. Apr. 2011, generating multilevel signals using a single pseudo-random binary sequence is disclosed.

From document Jikyung Jeong, "A CMOS 3.2 GB/S 4-PAM SERIAL LINK TRANSCEIVER", Dept of Electron. Eng., Sogang Univ., Seoul, South Korea, SoC Design Conference (ISOCC), 2009, International, a multilevel pulse amplitude modulation (PAM) transceiver is known. By using 4-PAM signaling, symbol rate is effectively decreased compared to the binary signaling.

It is an object of the present invention to provide a multi-level PRBS generator for generating a multilevel test signal.

SUMMARY

According to an embodiment of a first aspect, a method for generating multi-level PRBS patterns for testing purposes is provided, comprising the steps of: providing a binary PRBS signal with a binary bit pattern sequence; and mapping each bit of the binary bit pattern sequence to a symbol of a multilevel output.

According to a further embodiment, the symbol level is represented by a level of an electrical quantity, particularly of a voltage.

It may be provided that a first state of the bits of the binary bit pattern sequence is associated to a first set of symbols and a second state of the bits of the binary bit pattern sequence is associated to a second set of symbols.

Furthermore, the symbols of the first set of symbols may be represented by a level of an electrical quantity having a first sign, and the symbols of the second set of symbols are represented by levels of an electrical quantity having a second sign.

The above method may allow for the generation of multi-level pseudo-random symbol sequences for testing a transmission of a multilevel signal so that the received multi-level signal can be evaluated by a conventional binary PRBS checker. Therefore, the multi-level PRBS signal to be generated should comply with conventional PRBS checkers for binary signals and also provide the required characteristics of binary signals. The required characteristics of the test signal received in the PRBS checker are a specific frequency of zero crossings and a uniform distribution of symbols. This may allow for the simplification of the system testing if no multi-level checking device is available.

One idea of the embodiments of the invention is to extend a conventional binary PRBS generator with a symbol mapping unit which provides a positive and a negative valued symbol to the respective binary state of the binary signal provided by a conventional binary PRBS generator. The positive and negative symbols are respectively generated or provided on a per-bit basis of the binary PRBS signal so that the zero-crossings of the original binary PRBS pattern is maintained and hence a binary PRBS checker can be used for the verification of a received test signal, which has been transmitted over a transmission path to be tested. Furthermore, a uniform distribution also for short test pattern length can be obtained. Yet furthermore still, the frequency of the zero crossings of the original binary PRBS pattern is not affected.

The multilevel output may be an N-PAM output, wherein the first set of symbols has N/2 symbols and the second set of symbols has N/2 symbols.

Moreover, the symbols of the first and second set of symbols may be subsequently output in a pseudo random order.

According to an embodiment of another aspect, an apparatus for generating multi-level PRBS patterns is provided that includes a PRBS generator for providing a binary PRBS signal with a binary bit pattern sequence, and a mapping unit for mapping each bit of the binary bit pattern sequence to a symbol of a multilevel output. Moreover, the apparatus may further include a state machine of each state of the binary PRBS signal, and a bit tester for triggering one of the state machines depending on the state of the binary PRBS signal.

Preferably the state machines are configured to output one symbol of a list of symbols sequentially each time when being triggered by the bit tester.

According to a further embodiment, a signal combining unit may be provided for combining the outputs of the state machines to obtain the multilevel output.

The apparatus for generating multi-level PRBS patterns, according to embodiments of the invention, may be compliant to binary PRBS checkers and may provide uniformly distributed symbols wherein zero-crossings of a standard binary PRBS pattern are maintained.

In general, where features are described herein with reference to an embodiment of one aspect of the invention, corresponding features may be provided in embodiments of another aspect of the invention as appropriate.

BRIEF DESCRIPTION OF THE DRAWINGS

Embodiments of the present invention are described in more detail in conjunction with the accompanying drawings in which.

DETAILED DESCRIPTION

Figure 1:
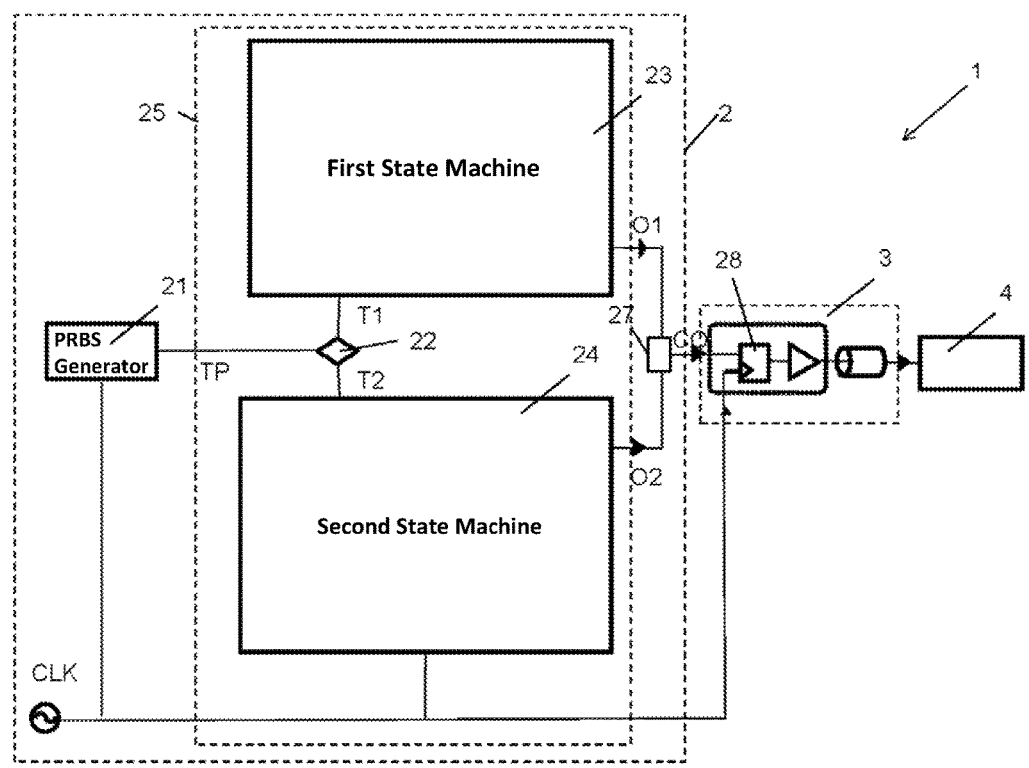
FIG. 1 is a schematic diagram showing an exemplary test system with a test signal generator, a transmission channel and a checking unit.
Figure 3:
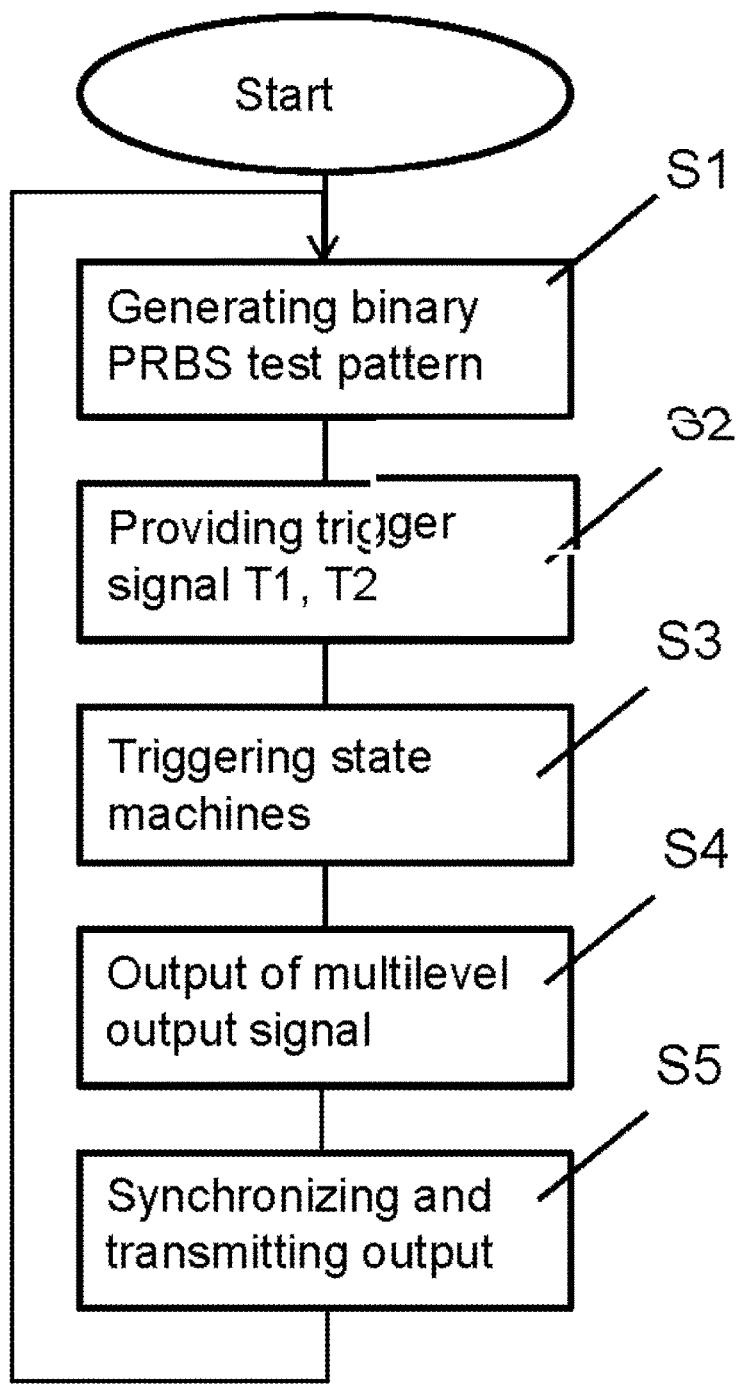
FIG. 3 a flowchart illustrating the showing the generation of a multi-level PRBS pattern that can be used in a test system.

The process of generating a multilevel pseudo random test signal is described now in conjunction with the test system of FIG. 1 and the method as illustrated by the flow chart of FIG. 3.

Referring to FIG. 1, a test system 1 is illustrated having a test symbol generator 2, a transmission channel 3 and a checking unit 4 to evaluate the transmitted test signal.

The test signal generator 2 comprises a standard binary NRZ (non-return to zero) PRBS (pseudo-random bit signal) generator 21 which outputs a serial sequence of a binary test pattern TP. The PRBS generator 21 is clocked by a clock signal CLK having a base frequency $f_0$.

The pseudo-random bit sequence TP generated by the PRBS generator 21 is supplied to a bit tester 22 of a mapping unit 25. The bit tester 22 provides a first trigger signal T1 and a second trigger signal T2 for each clock cycle. The first trigger signal T1 corresponds to a sequence of signal pulses which may, e.g., be edge controlled by the clock signal CLK and the state of the pseudo-random bit sequence TP so that, e.g., for each (rising/falling/both) edge of the clock signal CLK, a signal pulse of the first trigger signal T1 is generated if the actual bit of the pseudo-random bit sequence TP has a first state, and, for each (rising or falling or both) edge of the clock signal CLK, a signal pulse of the second trigger signal T2 is generated if the actual bit of the pseudo-random bit sequence TP has a second state. The characteristics of such trigger signals T1, T2 can be seen in the signal time diagram of FIG. 2, showing TP, T1, T2.

Figure 2:
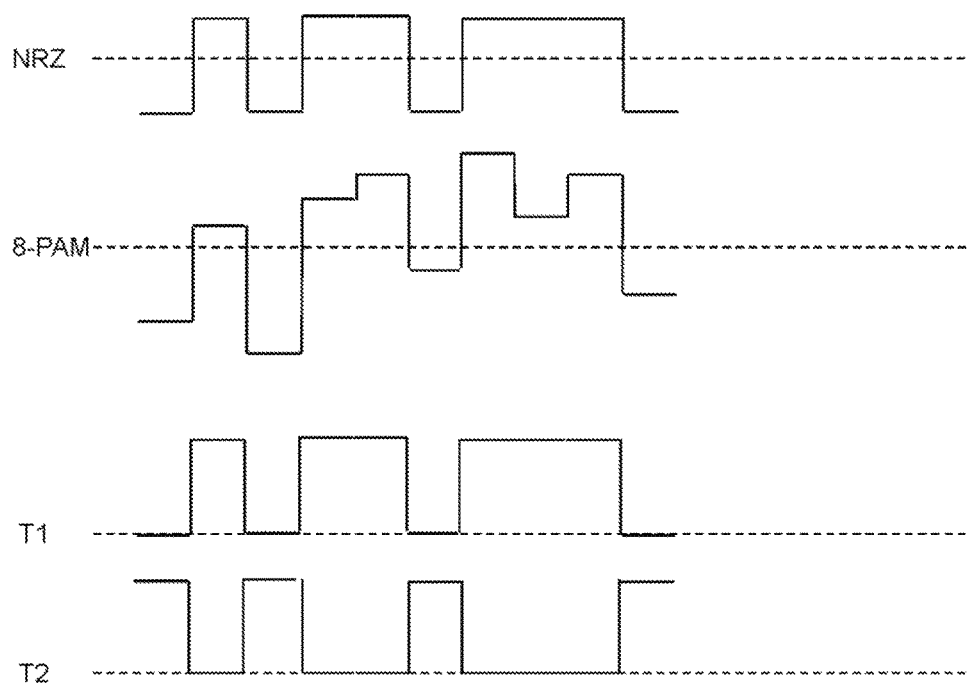
FIG. 2 is a signal diagram showing an exemplary binary test pattern and resulting first and second trigger signals.

Referring to FIG. 2, a signal diagram showing an exemplary binary test pattern and resulting first and second trigger signals is shown. The first trigger signal T1 is configured to trigger a first state machine 23 of the mapping unit 25, and the second trigger signal T2 is configured to trigger a second state machine 24 of the mapping unit 25, so that each is triggered by a signal pulse of the respective trigger signal T1, T2 so that each state of the pseudo-random bit sequence TP triggers one of the first and second state machines 23, 24.

Each time one of the state machines 23, 24 is triggered by the bit tester 22, the respective state machine 23, 24 provides a positive symbol (PS) or negative symbol NS, respectively, at its corresponding output. The positive symbol (PS) is represented by a physical measure having a first (e.g. positive) sign, and the negative symbol (NS) is represented by a physical measure having a second (e.g. negative) sign. The symbols PS, NS can be represented by electrical quantities, such as voltages or currents, so that, e.g., a positive symbol PS corresponds to a positive voltage level while the negative symbols NS correspond to negative voltage levels. However, in general, the voltage levels for the positive or negative symbols are selected so that "positive" and "negative" can be easily discriminated by a threshold voltage.

Each of the state machines 23, 24 subsequentially provides positive/negative symbols PS/NS according to a pseudo-random sequence of values, which are all positive or negative for the corresponding state machine 23, 24, respectively. The order of the symbols generated or provided by each of the state machines 23, 24 may be predefined to ensure that, for the first sequence of bits, no identical two symbols are provided. Preferably, for an N-PAM test signal to be generated, N/2 positive and N/2 negative symbols values should be generated. Therefore, each of the state machines 23, 24 provides a number of N/2 of symbols with the respective signs, wherein within the set of N/2 symbols no identical two symbol values are included.

For an 8-PAM test signal, the positive symbols may be +0.0625 V, +0.1875 V, +0.3125 V, and +0.4375 V, and the negative symbols may be −0.0625 V, −0.1875 V, −0.3125V, and −0.4375 V, in this order. The symbol values are in a range between 0.5 V and −0.5 V.

Apart from the symbol representation, the state machines 23, 24 may be identical and may include a counter. The counter is incremented for each signal pulse of the respective trigger signal T1, T2 and effects the output of the positive/negative value of the list of symbol values representing the positive/negative symbols PS/NS for the time of one clock cycle. In other words, depending on the counter value, the respective symbol is selected and output towards the transmission path 3. The state machines 23, 24 subsequently output the stored/fixed symbol values of the list of symbol values onto their respective output and starts over with a first symbol value once the list has been completed.

The output signals O1, O2 of the state machines 23, 24 are combined in a signal combining unit 27 which combines the symbol values provided by state machines 23, 24 to a combined multilevel output CO. The multilevel output CO is supplied to a multilevel latch 28 for synchronization with the clock signal CLK so that the symbol value is transmitted via the transmission channel 3. As a result, each symbol value is transmitted as a level of the electrical quantity (voltage), which is hold for the duration of one clock cycle. This is done so that the subsequent symbol levels correspond to the multilevel NRZ signal.

As the test signal is defined by the respective sign of the actual bit of the PRBS sequence TP, the frequency and occurrence of zero-crossings are maintained. Further, the PRBS bit sequence is pseudo-random as well as is the pseudo-random sequence of positive and negative symbol values subsequently provided by the state machines 23, 24 on a triggering event. The resulting test signal TS has a uniformly distributed symbol value. This allows a user to use the conventional binary PRBS checking unit 4 so that the transmission channel 3 can be tested with multi-level test signals TS even if a standard test equipment only capable for performing binary testing is used.

As the mapping unit 25 is included between the transmission path 3 and the conventional PRBS generator 21, standard test equipment can be applied, without any modification, for performing a multilevel testing.

Referring to FIG. 3, a flowchart illustrating the showing the generation of a multi-level PRBS pattern that can be used in a test system is shown. Regarding the method of generation of a multilevel pseudo-random test signal, a method as follows may be cyclically carried out.

In step S1, a standard binary NRZ (non-return to zero) PRBS test pattern TP is generated and supplied to the bit tester 22.

In step S2, the bit tester 22 provides a first trigger signal T1 or a second trigger signal T2, as explained above.

In step S3, the respective first or second state machine 23, 24, which is triggered by the respective first or second trigger signal T1, T2, provides a positive symbol (PS) or negative symbol (NS), respectively.

According to step S4, the triggered state machine outputs an output signal O1, O2 which provides a level of the multilevel output signal CO.

In step S5, the multilevel output signal CO is synchronized to the clock signal CLK and transmitted via the transmission channel 3.

Figure 4:
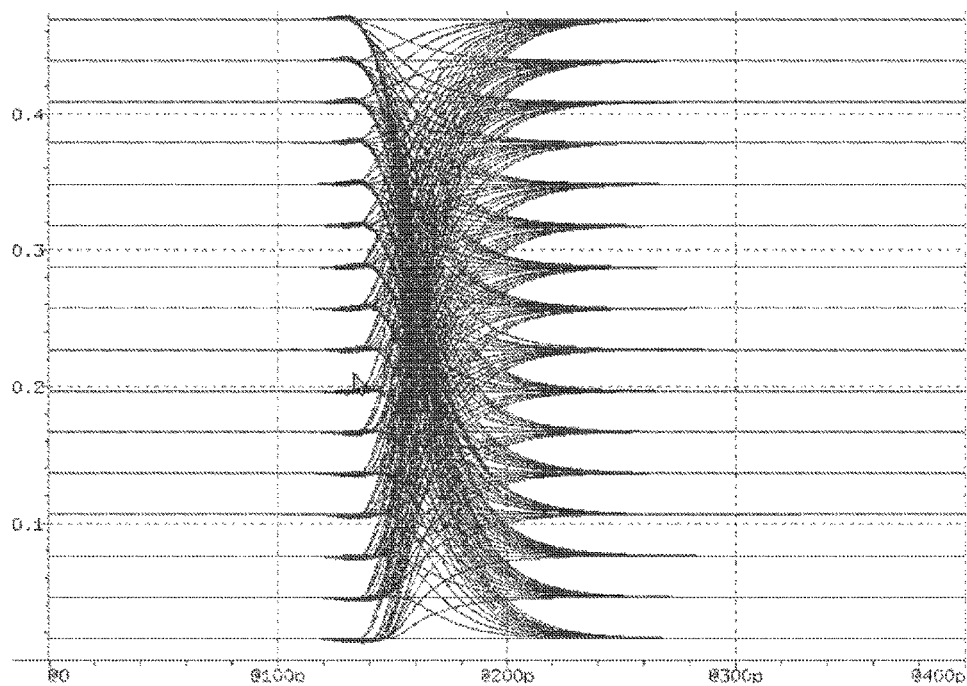
FIG. 4 is a graph showing signal characteristics comparing the pseudo-random bit sequence TP and the multilevel output generated therefrom.

In FIG. 4, a multilevel eye diagram of the pseudo-random test signal is shown.

While the invention has been described with respect to a limited number of embodiments, those skilled in the art, having benefit of this disclosure, will appreciate that other embodiments may be devised which do not depart from the scope of the invention as disclosed herein. Also, elements described in association with different embodiments may be combined. It should also be noted that reference signs in the claims should not be construed as limiting elements.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

REFERENCE LIST 1 test system
2 test symbol generator
3 transmission channel
4 checking unit
21 PRBS generator
22 bit tester
23 first state machine 24 second state machine
25 mapping unit
27 signal combining unit
28 multilevel latch
TP pseudo-random bit sequence
CO multilevel output

The invention claimed is:

1. A method for generating multi-level PRBS patterns, comprising:
providing a binary PRBS signal with a binary bit pattern sequence; and
mapping each bit of the binary bit pattern sequence to a symbol of a multilevel output,
wherein one symbol of a list of symbols is sequentially output each time one or more state machines are triggered by a bit tester configured for triggering a first state machine using a first trigger signal, and for triggering a second state machine using a second trigger signal for each of one or more clock cycles of a clock signal, and
wherein the multilevel output signal is synchronized to the clock signal and transmitted via a transmission channel.

2. The method according to claim 1, wherein the symbol level is represented by a level of an electrical quantity, particularly of a voltage.

3. The method according to claim 2, wherein a first state of the bits of the binary bit pattern sequence is associated to a first set of symbols and wherein a second state of the bits of the binary bit pattern sequence is associated to a second set of symbols.

4. The method according to claim 3, wherein the symbols of the first set of symbols are represented by levels of an electrical quantity having a first sign and the symbols of the second set of symbols are represented by levels of an electrical quantity having a second sign.

5. The method according to claim 4, wherein the symbols of the first and second set of symbols are subsequently output in a pseudo random order.

6. The method according to claim 4, wherein the multilevel output is a N-PAM output, wherein the first set of symbols has N/2 symbols and the second set of symbols has N/2 symbols.

7. The method according to claim 6, wherein the symbols of the first and second set of symbols are subsequently output in a pseudo random order.

8. The method according to claim 3, wherein the multilevel output is a N-PAM output, wherein the first set of symbols has N/2 symbols and the second set of symbols has N/2 symbols.

9. The method according to claim 8, wherein the symbols of the first and second set of symbols are subsequently output in a pseudo random order.

10. The method according to claim 2, wherein a first state of the bits of the binary bit pattern sequence is associated to a first set of symbols and wherein a second state of the bits of the binary bit pattern sequence is associated to a second set of symbols.

11. The method according to claim 10, wherein the symbols of the first set of symbols are represented by levels of an electrical quantity having a first sign and the symbols of the second set of symbols are represented by levels of an electrical quantity having a second sign.

12. The method according to claim 11, wherein the symbols of the first and second set of symbols are subsequently output in a pseudo random order.

13. The method according to claim 11, wherein the multilevel output is a N-PAM output, wherein the first set of symbols has N/2 symbols and the second set of symbols has N/2 symbols.

14. The method according to claim 13, wherein the symbols of the first and second set of symbols are subsequently output in a pseudo random order.

15. The method according to claim 10, wherein the multilevel output is a N-PAM output, wherein the first set of symbols has N/2 symbols and the second set of symbols has N/2 symbols.

16. The method according to claim 15, wherein the symbols of the first and second set of symbols are subsequently output in a pseudo random order.

17. An apparatus for generating multi-level PRBS patterns for testing purposes, comprising:
a PRBS generator for providing a binary PRBS signal with a binary bit pattern sequence; and
a mapping unit for mapping each bit of the binary bit pattern sequence to a symbol of a multilevel output,
wherein one symbol of a list of symbols is sequentially output each time one or more state machines are triggered by a bit tester configured for triggering a first state machine using a first trigger signal, and for triggering a second state machine using a second trigger signal for each of one or more clock cycles of a clock signal, and
wherein the multilevel output signal is synchronized to the clock signal and transmitted via a transmission channel.

18. The apparatus according to claim 17, the apparatus further comprising:
a state machine for each state of the binary PRBS signal,
wherein the triggering of the state machines by the bit tester is dependent on the state of the binary PRBS signal, and
wherein the state machines are configured to output one symbol of a list of symbols sequentially each time they are triggered by the bit tester.

19. The apparatus according to claim 18, the apparatus further comprising:
a signal combining unit for combining outputs of the state machines to obtain the multilevel output.

20. The apparatus of claim 17, wherein symbols of a first set of symbols are represented by levels of an electrical quantity having a first sign and symbols of a second set of symbols are represented by levels of an electrical quantity having a second sign.

* * * * *